United States Patent [19]

Kays

[11] 4,144,899
[45] Mar. 20, 1979

[54] FLEXIBLE-WALLED DEMOUNTABLE GREENHOUSE

[76] Inventor: Sandra E. Kays, 515 Milledge Heights, Athens, Ga. 30606

[21] Appl. No.: 869,457

[22] Filed: Jan. 16, 1978

[51] Int. Cl.² ............................ A45F 1/12; A45F 1/16
[52] U.S. Cl. ..................................... 135/1 R; 135/3 R; 135/15 PQ; 135/15 PE; 135/15 CF
[58] Field of Search ................. 135/1 R, 3 E, 15 PQ, 135/15 CF; 47/17, 18; 52/2, 80, 86

[56] References Cited

U.S. PATENT DOCUMENTS

| 620,719 | 3/1899 | Nicholson | 135/312 |
|---|---|---|---|
| 2,953,145 | 9/1960 | Moss et al. | 135/1 R X |
| 3,448,748 | 6/1969 | Walrare | 135/1 R |
| 3,625,235 | 12/1971 | Gorgichuk | 135/3 R X |
| 3,683,427 | 8/1972 | Burkholz et al. | 135/1 R X |

FOREIGN PATENT DOCUMENTS 1018037  9/1977  Canada ........................... 135/2

OTHER PUBLICATIONS

Moss Designs by Tent Works, dated Oct. 1977.

Primary Examiner—Benjamin Wyche
Assistant Examiner—Conrad L. Berman
Attorney, Agent, or Firm—Robert R. Keegan

[57] ABSTRACT

There is disclosed a flexible-walled demountable greenhouse in which the support structure consists of a plurality of rods, for example 6, extending from the periphery of the base to a cap structure at the top central portion of the greenhouse; the rods are of fiberglass or other strong, light material and are keyed at one end to lock into the cap structure. The walls are preferably a double thickness of plastic such as polyvinyl chloride or polyethylene having vertically extending seams to form sleeves in which the support rods are placed. The base of the support rods are engaged in nylon cup and anchor loops which may be anchored to the ground by stakes so that no floor or foundation is required. A zipper closured door is provided in the walls.

10 Claims, 6 Drawing Figures

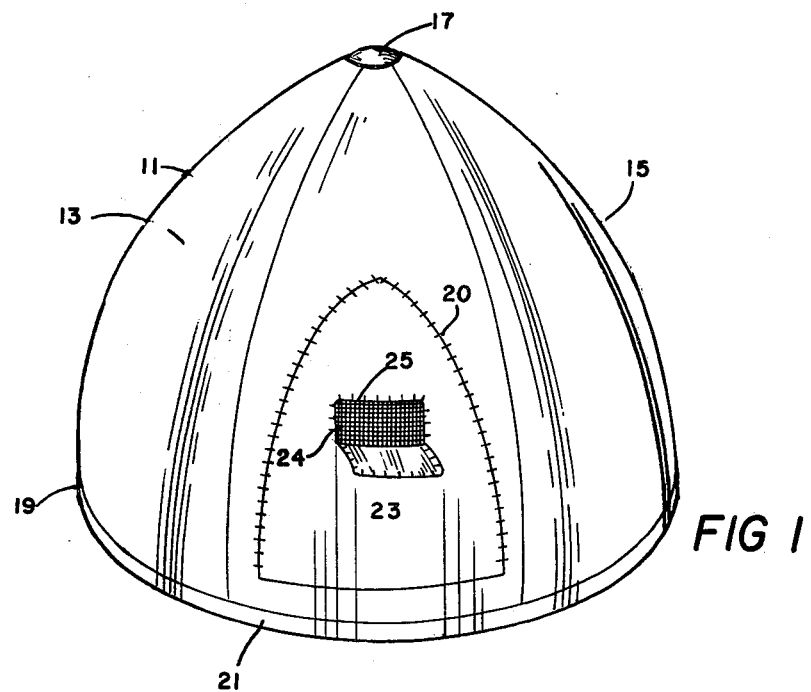
FIG 1
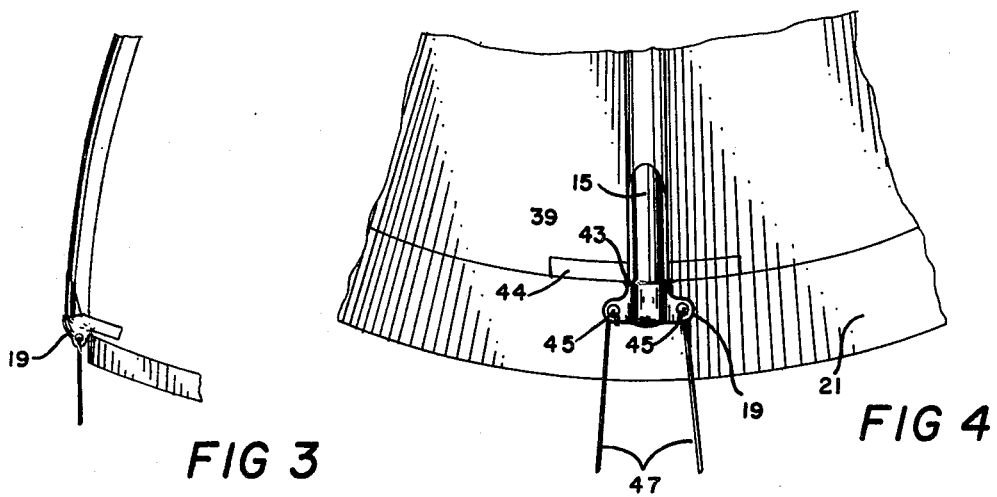
FIG 3
FIG 4

FLEXIBLE-WALLED DEMOUNTABLE GREENHOUSE

The present invention relates to greenhouses, particularly those of the portable or demountable type. The greenhouse according to the invention is intended for home, scientific or limited commercial use and has the advantage that it is a truly effective greenhouse structure with good energy efficiency and yet is light and portable or demountable so that it may be moved from place to place or stored during the summer or off-season.

While dome-shaped portable greenhouses have been devised by others, they have in general been makeshift structures not having the features and advantages of the present invention. The present invention is of notable simplicity; for example, the support structure consists only of a plurality of support rods and a cap into which they are inserted and locked, together with anchor loops for holding the lower ends of the rods in place. Nevertheless, the structure is firm and secure and not susceptible to wind damage or accidental collapse. The shape of the structure is such that it tends to reduce wind resistance and thus provides further immunity to wind damage.

Although the walls may be made of relatively thin sheet plastic material, the wall construction is such that the seams provide sleeves which engage substantially the entire length of the support rods and therefore reliably secure the walls in place to the support structure. Furthermore, in the preferred embodiment the walls are double with an air space between, greatly enhancing the insulating qualities of the wall while permitting transmission of radiant heat and light from the sun.

Among the particular advantages of the present invention are that it is quite inexpensive and can be considered a non-permanent structure; at the same time it may be expected to be serviceable for a number of years. It can be dismantled to be stored during the off-season or to be moved from one place to another. It can also be moved short distances without dismantling due to its very light weight. The simple construction which contributes to its low cost also makes it possible to assemble or dismantle the structure very readily with no special skill or elaborate tools required. While it may be placed on a base or foundation, such a foundation is not required, and it may be secured in place as a usual matter by the metal or plastic anchor stakes provided with the structure. In the preferred embodiment with a double-wall design, the insulation properties of the wall are greatly enhanced while retaining the transmissivity for heat and light radiation.

In addition to providing the above advantages, it is an object of the present invention to provide a portable or demountable greenhouse structure with flexible walls which is readily assembled into a unit wherein the support rods are effectively integrated into the wall structure.

It is another object of the invention to provide a greenhouse structure which is assembled and disassembled with a minimal number of bolts or other fasteners required to be emplaced or removed.

It is still another object of the invention to provide a portable or demountable greenhouse with flexible double walls supported by a dome-shaped structure of flexible rods.

Other objects and advantages will be apparent from consideration of the following description in conjunction with the appended drawings in which:

FIG. 1 is an isometric view of a greenhouse structure according to the present invention;

FIG. 3 is an enlarged detailed view of the bottom of one support rod and the bottom of the associated side wall in the structure of FIG. 1;

FIG. 4 is an enlarged detailed view of the cup and anchor loop portion of the apparatus of FIG. 3.

Figure 2:
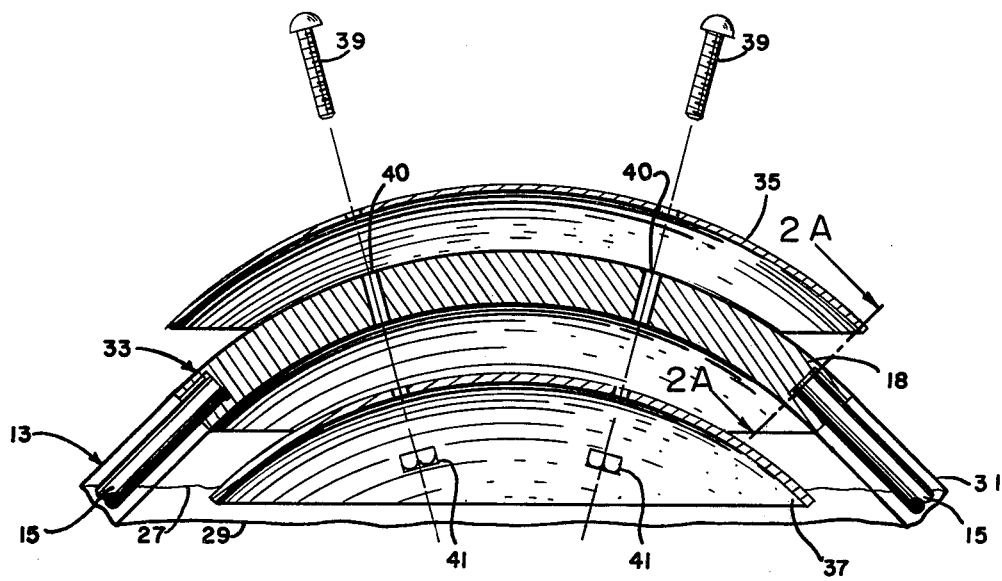
FIG. 2 is a fragmentary detailed view of the top portion of the structure of FIG. 1.

Referring now to the drawings and particularly to FIG. 1, a greenhouse structure 11 is shown according to the invention, the support structure for which includes 6 flexible support rods 15 of fiberglass or similar lightweight, strong material together with a cap structure 17. The rods 15 are preferably flexible rods which are straight in their unflexed condition but which may readily be bent to the contour shown in FIG. 1 in the assembled structure. Each of the rods 15 is inserted into an opening in the cap structure 17. The walls 13 are formed of flexible plastic sheet.

While 6 support rods are shown in FIG. 1, a greater number of support rods may be utilized in larger structures. A relatively small structure is shown in FIG. 1 which might have dimensions, for example, of 8 to 10 feet in diameter and a height of 6 feet. A larger structure of 14 feet in diameter may have a height of approximately 8½ feet and may be constructed with 8 support rods. A still larger structure of 30 feet in diameter may have a height of 12 feet and be constructed with 10 rods.

A door 23 is provided by cutting an opening in the wall and providing it with a zipper closure. The zipper 20 is an all-weather zipper operable from the inside or outside. Preferably the double wall is joined together at the zipper 20 to avoid the necessity for a separate zipper or closure for each of the walls. The door 23 is left connected at the bottom so that when fully opened it would lay flat. Alternatively, the door opening may be left connected on one side rather than the bottom so that with the zipper partially opened, entry may be obtained by lifting the door like a tent flap. The greenhouse may be provided with one or more vents 25 also with a zipper closure and a plastic screen 24 may be provided to cover the vent opening against the entry of insects. Vents 25 may be provided as shown in the door or alternatively or in addition may be located in the rear or side wall of the greenhouse or they may be located in other positions than shown. Also, other more sophisticated ventilating and temperature control means such as fans and thermostats may be readily adapted to the greenhouse structure if desired.

The cap and support rod assembly is shown in greater detail in FIG. 2. The cap structure 17 is illustrated with a round cross-section; it may alternatively be polygonal. The cap structure 17 fits in an opening in the top of the greenhouse flexible wall 13 and is held in place in the opening by a cover plate 35 and an inside plate 37 which are secured by bolts 39 which pass through bolt holes 40 in the cap body 18 and are secured by nuts 41.

Figure 2A:
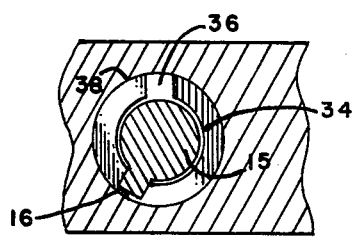
FIG. 2A is a sectional view taken along the line 2A—2A in FIG. 2.

As best shown in FIG. 2A, six (6) openings 34 are provided in the cap body 18, each of which has a keyway 36. Each rod 15 has a key 16 matching the keyways 36. Within the opening 34 there is a locking groove 38.

As better seen in FIG. 2, the greenhouse wall comprises a plurality of similar interior gore-shaped panels 29 and exterior gore-shaped panels 27. As shown in FIG. 2, these panels are secured together at seams formed by sewing or heat sealing in a manner that also provided a sleeve 31 at each seam or adequate dimension to allow at least about one-inch space between interior and exterior walls and to accept fiberglass rod 15. In the assembly of the structure the fiberglass rods are inserted in sleeves 31 before being locked into the cap structure 17.

The botton of each sleeve 31 is cut or slit as better shown in FIG. 3 to provide an exit hole for the bottom of the fiberglass rod. At the bottom of each sleeve 31 is a retaining cup and anchor loop 19. At the bottom of the wall is a ground flap which is attached by sewing or heat sealing it to the lower edges of panels 27 and/or 29.

Figure 5:
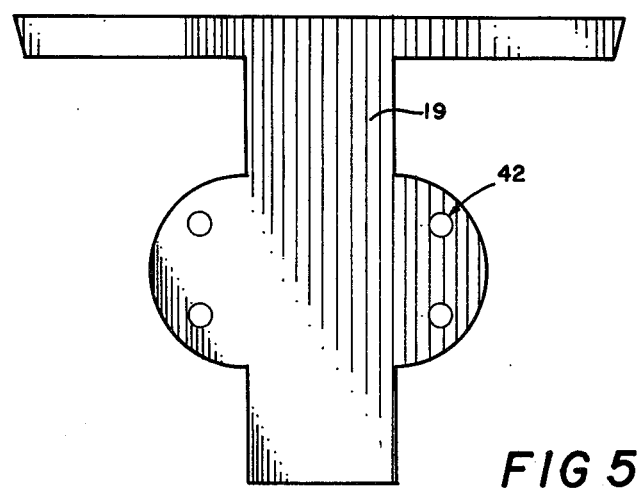
FIG. 5 is an enlarged unfolded view of the cup of FIG. 4.

The cup and anchor loop is shown in detail in FIG. 4 and unfolded in FIG. 5. The cup and anchor loop 19 has a cup portion 43 which retains the bottom end of the support rod 15. The cup 19 is secured in position by means of stakes 47 passing through openings 45 which are preferably reinforced with grommets.

The cup and anchor loop 19 is secured into the greenhouse wall at the seam between the ground flap 21 and the panels 29, and a reinforcing strip 44 is provided to strengthen the attachment of the cup and anchor loop 19. The construction of the cup and anchor loop 19 may be better appreciated from FIG. 5 which illustrates the flat pattern from which it is assembled. The pattern in FIG. 5 is cut from nylon or other tough sheet material and is folded over and seamed as illustrated in FIG. 4 to form the cup and anchor loops. The anchor loops 45 are preferably further reinforced with grommets of brass or other metal.

Preferably a shallow trench is provided around the periphery of the greenhouse, and the ground flap 21 is buried in the trench to provide a seal around the bottom of the greenhouse and to aid in securing it in position. Alternatively, the ground flap may be turned inside the greenhouse and covered with soil to obtain a similar effect.

The assembled structure is supported by the outward flex of the fiberglass rods 15 which are contained by the shape of the covering plastic wall 13. The fiberglass rods are also held in flexed position by the retaining cups 19 at the base of the structure.

The integrity of the structure is further enhanced by the fact that the rods are individually enclosed in sleeves between respective ones of the gore sheets or panels 27. If desired, the structure may be made in a single wall form, but a sleeve 31 for the rods 15 should be provided in such case also.

The panels 27 and 29 will, of course, at least in part be translucent or transparent and may be formed of plastic such as polyvinyl chloride, polyethylene, Flexgard, etc.

The dead air space between the interior and exterior panels in the double wall construction will be at least about one inch and will be determined by the diameters of the sleeves. The diameter of the rods may be from approximately ½-inch to approximately 1 inch. Preferably, each section or panel of the greenhouse represents an individual sealed air space in the assembled structure; thus if a puncture should occur, it would only affect one section of the dome. It may be noted that each of the double wall sections may be left open at the top where the cap structure 17 is installed in order that air can flow into the air space between the interior and exterior walls as the rods 15 are inserted and the structure is assembled.

From the foregoing description, it will be seen that a simple, lightweight, readily assembled greenhouse structure is provided which is nevertheless structurally sound, efficient and effective. The design may be modified in various ways by providing greater numbers of openings, making portions of the wall opaque or reflective, and in numerous other ways. In addition to the modifications and variations shown or suggested, numerous other modifications and variations will be apparent to those skilled in the art. Accordingly, the scope of the invention is not to be deemed limited to the specific variations shown or suggested but is to be determined by reference to the appended claims.

What is claimed is:

1. A demountable dome-shaped flexible-walled greenhouse structure comprising
   a frame including at least six flexible support rods of round cross-section and a cap having means for engagement with the upper ends of said support rods,
   a plurality of wall panels of flexible sheet material equal in number to twice the number of said support rods, said panels being seamed together to form dome-shaped, spaced, double thickness walls for said structure,
   said panels having respective sleeves extending in a vertical direction between said walls and dimensioned to accommodate said support rods,
   said cap further being formed of at least two parts, the first part containing respective holes, radially arranged to receive each of said rods, and the second being shaped to fit over the first and to capture the upper edge of said panels between said first and second parts,
   retaining means secured to said panels near the lower end of said sleeves to receive the ends of said rods,
   and means for anchoring said retaining means to the ground.

2. A structure as claimed in claim 1 further including a ground flap at the bottom of said wall around the periphery thereof adapted to be covered with soil to provide a seal between said wall and the ground on which the structure rests.

3. A structure as claimed in claim 1 further including an opening in said wall with a cover secured thereover by a zipper fastener.

4. A demountable dome-shaped flexible-walled structure comprising
   a frame including at least six flexible support rods and a cap having means for engagement with the upper ends of said support rods,
   a plurality of wall panels of flexible sheet material at least equal in number to said support rods, said panels being seamed together to form a dome-shaped flexible wall for said structure,
   said panels having respective sleeves extending in a vertical direction and dimensioned to accommodate said support rods,
   said cap being generally shaped as a segment of a sphere and further being formed of at least two parts, the first part containing holes, radially arranged to receive respective ones of said rods, the second part being shaped to fit snugly over the first part and to capture the upper edge of the outside ones of said panels between said first and second parts, and fastening means for fastening said first and second parts of said cap together, said cap having locking means to lock said rods in place in said openings, retaining means secured to said panels near the lower end of said sleeves including means for receiving the ends of said rods, and means for anchoring said retaining means to the ground.

5. A structure as claimed in claim 4 further including a ground flap at the bottom of said wall around the periphery thereof adapted to be covered with soil to provide a seal between said wall and the ground on which the structure rests.

6. A structure as claimed in claim 4 further including an opening in said wall with a cover secured thereover by a zipper fastener.

7. A demountable dome-shaped flexible-walled greenhouse structure comprising a frame including at least six flexible support rods and a cap having means for engagement with the upper ends of said support rods, a plurality of wall panels of flexible sheet material equal in number to twice the number of said support rods, said panels being seamed together to form dome-shaped, spaced, double thickness walls for said structure, said panels having respective sleeves extending in a vertical direction between said walls and dimensioned to accommodate said support rods, said cap further being formed of at least three parts, the first part containing holes radially arranged to receive respective ones of said rods, the second part being shaped to fit snugly over the first part and to capture the upper edge of the outside ones of said panels between said first and second parts, and the third part being shaped to fit snugly against the bottom of said first part and to capture the upper edge of the inner ones of said panels between said first and third parts and fastening means for fastening said first, second and third parts of said cap together, and retaining means secured to said panels near the lower end of said sleeves to receive the ends of said rods.

8. A structure as claimed in claim 7 further including a ground flap at the bottom of said wall around the periphery thereof adapted to be covered with soil to provide a seal between said wall and the ground on which the structure rests.

9. A structure as claimed in claim 7 further including an opening in said wall with a cover secured thereover by a zipper fastener.

10. A structure as claimed in claim 7 wherein said cap openings accepting said rods include locking means to lock said rods in place in said openings.

* * * * *